United States Patent
Miyoshi et al.

(10) Patent No.: US 7,474,970 B2
(45) Date of Patent: Jan. 6, 2009

(54) INFORMATION PROCESSING APPARATUS AND HEAD RETRACTION PROCESSING METHOD OF BUILT-IN HARD DISK DRIVE THEREOF

(75) Inventors: Naoki Miyoshi, Tokyo (JP); Keisuke Koide, Tokyo (JP); Hirotaka Takahashi, Tokyo (JP); Masaru Kawata, Nagano (JP)

(73) Assignee: Sony Corporation (JP)

( * ) Notice: Subject to any disclaimer, the term of this patent is extended or adjusted under 35 U.S.C. 154(b) by 14 days.

(21) Appl. No.: 11/635,226

(22) Filed: Dec. 6, 2006

(65) Prior Publication Data

US 2007/0150211 A1    Jun. 28, 2007

(30) Foreign Application Priority Data

Dec. 28, 2005    (JP)    .......................... P2005-377871

(51) Int. Cl.
G06F 19/00    (2006.01)

(52) U.S. Cl. .......................... 702/56; 345/115; 360/75; 702/141

(58) Field of Classification Search .................. 702/34, 702/56, 122, 188, 141, 182; 360/60, 69, 360/75, 97.01; 345/115, 121
See application file for complete search history.

(56) References Cited

U.S. PATENT DOCUMENTS

| 5,982,573 A | * | 11/1999 | Henze | .......................... 360/75 |
| 7,251,094 B2 | * | 7/2007 | Miyano | ........................ 360/75 |
| 2007/0177295 A1 | * | 8/2007 | Miyoshi et al. | ................ 360/75 |

* cited by examiner

*Primary Examiner*—John H Le
(74) *Attorney, Agent, or Firm*—Lerner, David, Littenberg, Krumholz & Mentlik, LLP

(57) ABSTRACT

An information processing apparatus is disclosed. The information processing apparatus includes a hard disk drive, an acceleration sensor, a determination section, and a threshold value setup section. The hard disk drive is capable of retracting a head to a data-free landing zone. The acceleration sensor detects acceleration. The determination section obtains high frequency components from acceleration information detected by the acceleration sensor, obtains a vibration level corresponding to the obtained high frequency components, compares the vibration level with a threshold value which has been set up, and determines whether or not there is a necessity to retract the head of the hard disk drive to the data-free landing zone. The threshold value setup section allows a user to change the threshold value and set up the changed threshold value.

5 Claims, 10 Drawing Sheets

INFORMATION PROCESSING APPARATUS AND HEAD RETRACTION PROCESSING METHOD OF BUILT-IN HARD DISK DRIVE THEREOF

CROSS REFERENCES TO RELATED APPLICATIONS

The present invention contains subject matter related to Japanese Patent Application JP 2005-377871 filed in the Japanese Patent Office on Dec. 28, 2005, the entire contents of which being incorporated herein by reference.

BACKGROUND OF THE INVENTION

1. Field of the Invention

The present invention relates to an information processing apparatus that has a built-in hard disk drive (HDD) and a head retraction processing method of the built-in hard disk drive.

2. Description of the Related Art

In a portable device such as a note-type PC, it is important to protect the device against shock if the device is mistakenly dropped or if the shock is applied from the outside when the device is carried by hand or normally used. In particular, in a magnetic disk drive such as a hard disk drive (HDD) used as a recording device, a magnetic head reads and writes data from and to a rotating magnetic disk. Thus, when the magnetic head collides with the magnetic disc due to shock or vibration applied to the device, the magnetic disk may be damaged and data recorded thereon may be destroyed. Although the HDD may have a built-in acceleration sensor, the HDD temporarily stops writing data on the disc in many cases. Even if the HDD retracts the head, it may not precisely control its operation.

To solve this problem, an acceleration sensor or the like may be built in the device. When the acceleration or an amount of its change that the acceleration sensor detects exceeds a predetermined level, the device may retract the magnetic head to a data-free landing zone.

In this related art, when the HDD is subjected to shock or vibration, the HDD temporarily stops writing data to the record medium. However, when the HDD stops writing data to the record medium, data may be prevented from being written to an incorrect address. However, since the head is placed immediately above the medium, if the head is subjected to strong shock or vibration, the head may contact the medium. As a result, the head may be damaged.

To solve such a problem, a sensor such as an acceleration sensor may be used to detect shock or vibration applied to the HDD. When the sensor detects shock or vibration, the HDD retracts the head to the data-free landing zone. In this related art for example Japanese Patent Application Laid-Open No. 2005-346840, it is determined whether or not the device is being dropped corresponding to acceleration for the X axis, Y axis, and Z axis. When this state is detected, the head of the HDD is retracted to the data-free landing zone.

SUMMARY OF THE INVENTION

However, the acceleration sensor is a device that detects acceleration, namely a change of speed per unit time. Thus, if a shock/vibration determination process is performed corresponding to only the levels of acceleration information obtained from the sensor, the magnetic head may be unnecessarily retracted. As a result, the operability for the user may be deteriorated. While music data or video data are being reproduced from the HDD, if the head is retracted, video or sound may be temporarily stopped.

Generally, the acceleration sensor is a device that provides acceleration information. Thus, to determine whether or not the HDD is subjected to shock or vibration, a dedicated shock/vibration processing section is used. To implement this section by for example a PC, a program (driver) that operates on an operating system (OS) or a dedicated LSI may be provided.

However, when the shock/vibration determination is performed with the program (driver) that operates on the OS, due to characteristics of the PC, resources of the CPU are inevitably used. It is necessary to perform the shock/vibration determination in real time. Thus, the CPU use rate increases. As a result, the power consumption of the device increases. It is important to decrease the power consumption of the note-type PC as much as possible to prolong the battery lift. Thus, an increase of power consumption is a serious problem.

In contrast, when the dedicated LSI is incorporated into the device, not only the power for the LSI, but the area for the LSI and a peripheral circuit are necessitated. Thus, as problems of this method, the cost and the circuit scale will increase.

In view of the foregoing, it would be desirable to provide an information processing apparatus and a head retraction processing method for a built-in hard disk drive that allow a necessity for performing head retraction process based on the acceleration information to be determined precisely according to user's operational style.

According to an embodiment of the present invention, there is provided an information processing apparatus. The information processing apparatus includes a hard disk drive, an acceleration sensor, a determination section, and a threshold value setup section. The hard disk drive is capable of retracting a head to a data-free landing zone. The acceleration sensor detects acceleration. The determination section obtains high frequency components from acceleration information detected by the acceleration sensor, obtains vibration levels corresponding to the obtained high frequency components, compares the vibration level with a threshold value which has been set up, and determines whether or not there is a necessity to retract the head of the hard disk drive to the data-free landing zone. The threshold value setup section allows a user to change the threshold value and set up the changed threshold value.

Since high frequency components of acceleration information contain shock/vibration components, according to an embodiment of the present invention, the shock/vibration components are detected corresponding to the high frequency components of the acceleration information to determine whether or not there is a necessary to retract the head of the hard disk drive to a data-free landing zone. Thus, the level of shock/vibration applied to the hard disk drive can be correctly determined and the head can be retracted to the data-free landing zone. As a result, the hard disk drive can be protected. In addition, since the user can freely change a threshold value that is a reference for evaluating the vibration levels, the necessity to retract the head of the hard disk drive to the data-free landing zone can be determined corresponding to both acceleration information and user's operational style. Thus, the head can be prevented from being unnecessarily retracted to the data-free landing zone. As a result, the operability for the user is improved.

The acceleration sensor may detect acceleration of directions of three axes. The determination section may obtain high frequency components from acceleration information of directions of three axes detected by the acceleration sensor, obtain vibration levels corresponding to the obtained high frequency components, compare the vibration level with a threshold value which has been set up, and determine whether or not there is a necessity to retract the head of the hard disk drive to the data-free landing zone.

The information processing apparatus may further include a display section which is capable of displaying information for the user. The threshold value setup section may display a man-machine interface screen on the display section to allow the user to change the threshold value and set up the changed threshold value, obtain information about the threshold value that the user has input on the man-machine interface screen, and send a request to the determination section to change the threshold value.

Since the user can change the threshold value corresponding to the user's operational style on the man-machine interface, when the user sets up the threshold value, the operability for the user is improved.

The threshold value setup section may periodically obtain a vibration level from the determination section and display the obtained vibration level on the man-machine interface screen. Thus, the user can select an optimum threshold value while the user is applying shock or vibration to the information processing apparatus.

The threshold value setting section may display the threshold value which has been set up by the user on the man-machine interface screen so at to compare the threshold value with the vibration level. Thus, the user can select a threshold value while comparing it with a vibration level. As a result, the user can set up an optimum threshold value corresponding to user's operational style.

According to an embodiment of the present invention, there is provided a head retraction processing method for a built-in hard disk drive. An acceleration sensor is caused to detect acceleration. High frequency components are obtained from the detected acceleration information. Vibration levels are obtained corresponding to the obtained high frequency components. The vibration levels are compared with a threshold value which has been set up. It is determined whether or not there is a necessity to retract the head of the hard disk drive to the data-free landing zone. A user is allowed to change the threshold value and set up the changed threshold value.

In an information processing apparatus and a head retraction processing method for a built-in hard disk drive embedded thereof, a necessity for performing a head retraction process can be determined corresponding to both acceleration information and a user's operational style.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, embodiments of the present invention will be described.

Figure 1:
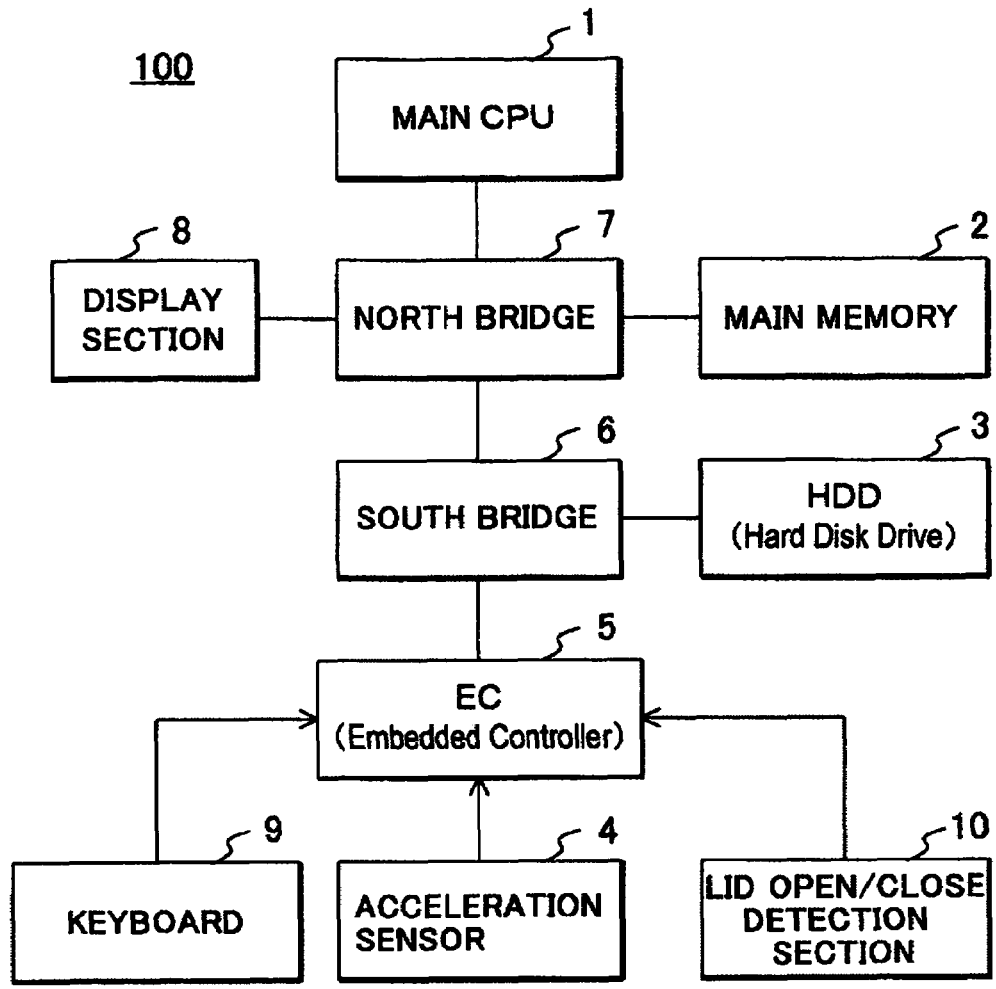
FIG. 1 is a block diagram showing hardware of a note-type PC according to an embodiment of the present invention.

FIG. 1 is a block diagram showing hardware of a note-type PC 100 according to an embodiment of the present invention.

The note-type PC 100 includes a main central processing unit (CPU) 1, a main memory 2, a hard disk drive (HDD) 3, an acceleration sensor 4, a built-in controller (EC) 5, a south bridge 6, a north bridge 7, a display section 8, a keyboard 9, and a lid open/close detection section 10. The display section 8 is made up of a liquid crystal display (LCD) disposed on a lid of the note-type PC 100.

The main CPU 1 performs various types of calculation processes for executing an OS, an application program (that includes utility software 13), and so forth. The OS and the application program are stored in the main memory 2. The application program operates on the OS. The HDD 3 is used as an external storage device for the note-type PC 100. The acceleration sensor 4 is a device that detects acceleration that acts on the note-type PC 100 to protect the HDD 3.

The EC 5 is a device that performs a process for the keyboard 9, a power management defined in Advance Configuration and Power Interface (ACPI), a process for signals supplied from the acceleration sensor 4 and generating acceleration information, and a shock/vibration determination process corresponding to the acceleration information. Hereinafter, these functions of the EC 5 are referred to as the "shock/vibration determination engine". Specifically, the EC 5 is a large scale integration (LSI) device that has a CPU, a read-only memory (ROM), a random access memory (RAM), and so forth. The shock/vibration determination engine is denoted by reference numeral 11. The shock/vibration determination engine 11 is accomplished by software that operates on the CPU.

The south bridge 6 is a circuit that controls information that flows among devices such as the HDD 3, the EC 5, and the north bridge 7. Likewise, the north bridge 7 is a circuit that controls information that flows among devices such as the south bridge 6, the display section 8, the main CPU 1, and the main memory 2. The display section 8 is a device that displays information for a user. The keyboard 9 is a device that processes data that the user inputs. The lid open/close detection section 10 is a device that detects whether or not the lid is open or closed.

Figure 2:
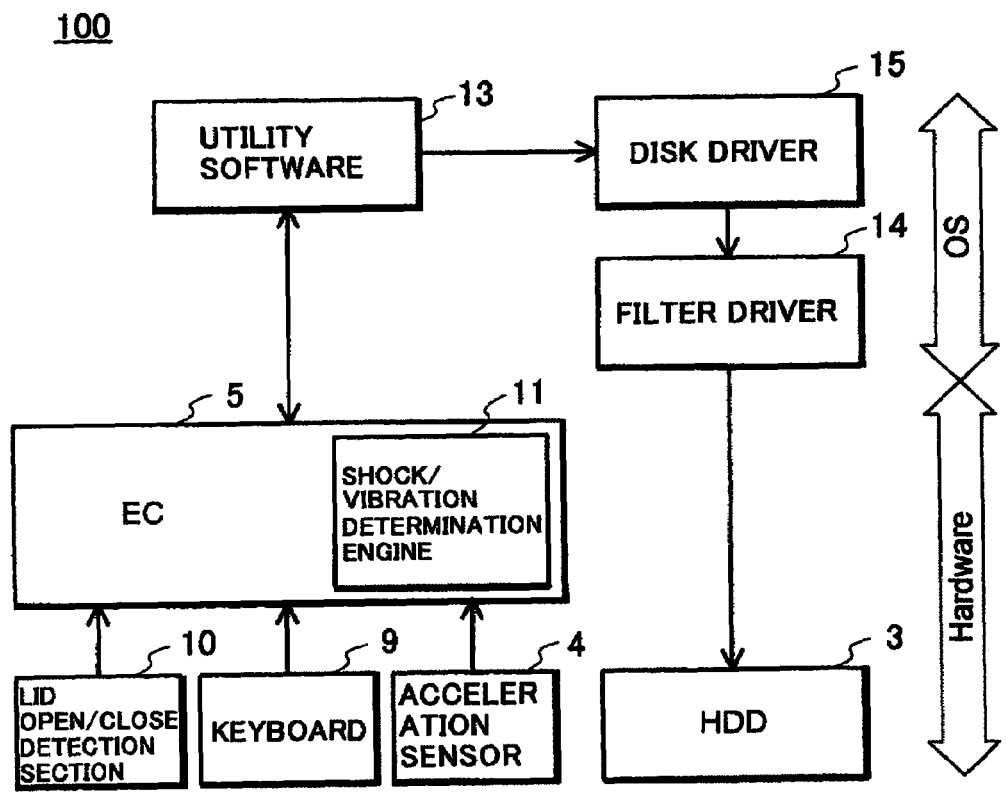
FIG. 2 is a functional block diagram of the note-type PC shown in FIG. 1.

FIG. 2 is a functional block diagram of the note-type PC 100 shown in FIG. 1. The shock/vibration determination engine 11 of the EC 5 determines whether or not the note-type PC 100 is subjected to shock or vibration corresponding to acceleration information supplied from the acceleration sensor 4, whether or not there is a necessity to retract a magnetic head of the HDD 3, and changes their sensitivity. These sensitivity is changed when the user changes sensitivity, when a key of the keyboard 9 is pressed, and when the lid is opened or closed corresponding to an output of the lid open/close detection section 10. The shock/vibration determination engine 11 is not limited to software implemented in the EC 5, but software executed by the main CPU 1.

The acceleration sensor 4 is a sensor that can detect acceleration in the directions of three axes, X axis, Y axis, and Z axis. Although a sensor that has a zero-gravity detection mechanism other than the three axis type is available, according to this embodiment, a sensor that does not have the zero-gravity detection mechanism is used to reduce the sensor dependability. The acceleration sensor 4 outputs acceleration information in the directions of the three axes as analog signals to the EC 5. Instead, the acceleration sensor 4 may be connected to the EC 5 through a serial communication such as I2CBUS.

Figure 3:
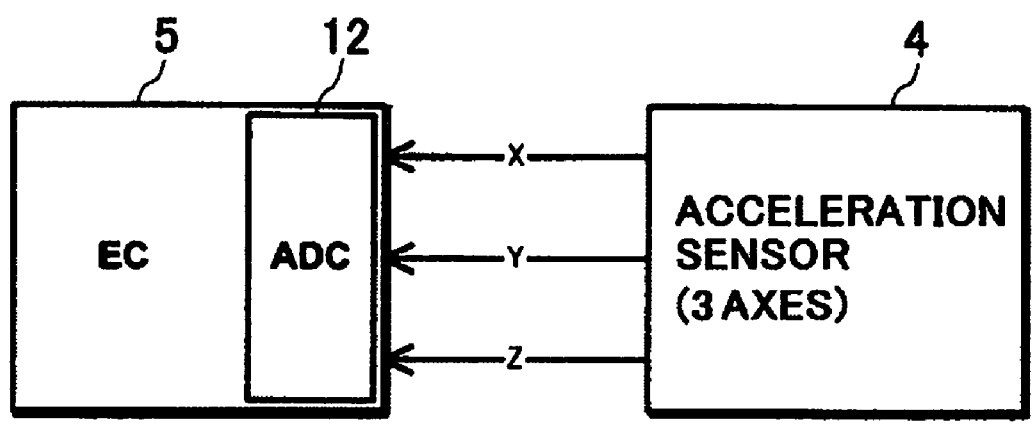
FIG. 3 is a schematic diagram showing connections of an EC and an acceleration sensor of the note-type PC shown in FIG. 1.

FIG. 3 is a schematic diagram showing connections of the EC 5 and the acceleration sensor 4. As shown in FIG. 3, the EC 5 has an A/C converter (ADC) 12 that converts analog signals for the X axis, Y axis, and Z axis that are output from the acceleration sensor 4 into digital signals.

Returning to FIG. 2, utility software 13 is software that operates on the OS. The utility software 13 issues a head retraction command to the HDD 3 corresponding to a request command supplied from the shock/vibration determination engine 11 of the EC 5. The head retraction command is for example Idle Immediate with Unload command defined in ATA-7 standard. This command causes the HDD 3 to become idle and the magnetic head to be retracted to the data-free landing zone. Instead of the Idle Immediate with Unload command, commands such as Idle command and Standby command that cause the magnetic head to be retracted may be used.

Figure 4:
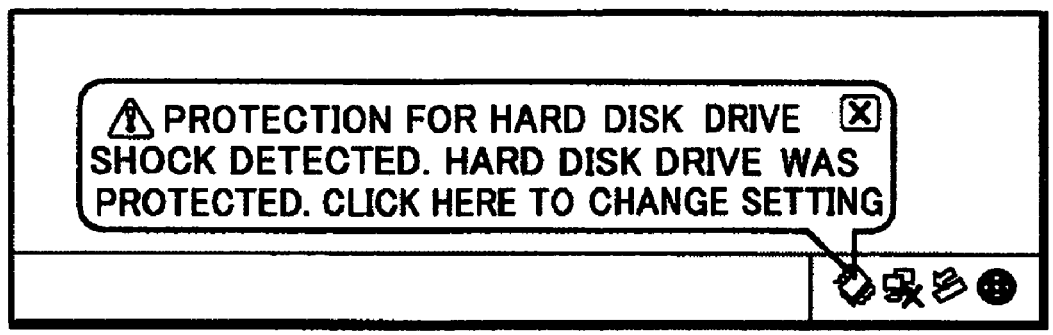
FIG. 4 is a schematic diagram showing a display message upon retraction of a magnetic head of a HDD.

The utility software 13 causes a message indicating that a protection function for the HDD 3 is operating to be displayed when the magnetic head is retracted as shown in FIG. 4. Since the note-type PC 100 is provided with a mechanism that communicates with the EC 5, the utility software 13 provides a sensitivity change mechanism and displays current shock levels and so forth.

When the utility software 13 issues the head retraction command to the HDD 3, a filter driver 14 detects the command. When the filter driver 14 has detected the command, the filter driver 14 blocks commands issued from a disk driver 15 or the like to the HDD 3 for a predetermined period (for example, around 2 to 3 seconds). In other words, since commands are blocked, the HDD 3 is not accessed. Thus, the magnetic head is kept retracted. The period for which commands are blocked may be changed by the utility software 13 or the like depending on the levels of shock and vibration.

Next, a basic flow until the magnetic head of the HDD 3 is retracted corresponding to acceleration information in the note-type PC 100 will be described.

1. When the EC 5 (shock/vibration determination engine 11) has determined that there is a necessity to retract the magnetic head of the HDD 3, the EC 5 sends a "request for issuing the head retraction command to the HDD 3" to the utility software 13.

2. Corresponding to the request, the utility software 13 issues the magnetic head retraction command to the HDD 3.

3. When the HDD 3 receives the magnetic head retraction command, the HDD 3 retracts the magnetic head to the data-free landing zone.

4. The filter driver 14 detects that the utility software 13 has issued the magnetic head retraction command and blocks the HDD 3 from being accessed for a predetermined period (around 2 to 3 seconds).

Next, the shock/vibration determination process performed by the shock/vibration determination engine 11 will be described in detail.

[Filter function]

The acceleration sensor 4 according to this embodiment is a sensor that can measure gravitational acceleration in a still state. Thus, information that is output from the acceleration sensor 4 is the sum of gravitational acceleration and acceleration due to shock and vibration. The acceleration information obtained from the acceleration sensor 4 is not directly used, but divided into high frequency components and low frequency components by a filter process. As a result, the acceleration information can be decomposed into characteristic motions. The high frequency components of the acceleration information mainly contain a motion due to shock or vibration. In contrast, the low frequency components of the acceleration information mainly contain a motion due to gravitational acceleration or slow operation.

The shock/vibration determination engine 11 assigns a threshold value to each of the high frequency components and the low frequency components. As a result, the shock/vibration determination engine 11 can make the following determinations.

(a) The high frequency components are mainly used to determine shock and vibration.

(b) The low frequency components are mainly used to determine variation of gravitational components.

The determination of variation of gravitational components includes determination of zero-gravity and determination of carrying state of the note type PC in which the low frequency components largely vary.

Obtaining Low Frequency Components (by Low Pass Filter)

A method of realizing the low pass filter is not specifically limited in this embodiment. The low pass filter may be accomplished as a filter based on an infinite-duration impulse response (IIR) type filter by software. Since the IIR type filter is well known as a digital filter, its description will be omitted.

When acceleration input values obtained from the acceleration sensor 4 are denoted by G[n], a filter function Glpf[n] is given by the following formula.

$$Glpf[n]=Glpf[n-1]+\beta(Glpf[n-1]-G[n])$$

where β is a parameter that is used when the characteristics of the low pass filter are changed. In addition, β is a value given as a parameter of the program. In this example, β is assigned as ⅛. When β=8 is substituted into the foregoing formula, the following formula is obtained.

$$Glpf[n]=Glpf[n-1]+(⅛)(Glpf[n-1]-G[n])$$

where Glpf[n−1] is a value obtained in the immediately preceding calculation. When the filter process is designed to be performed every 5 msec, the value of 5 msec before is obtained. However, when the low pass filter is accomplished by a program, it is necessary to substitute G[n] into Glpf[n−1] as an initial value in the first time.

The shock/vibration determination engine 11 performs this calculation for the X axis, Y axis, and Z axis. The obtained values Glpf[n] are stored.

Obtaining High Frequency Components (by High Pass Filter)

Likewise, a method for accomplishing the high pass filter is not specifically limited in this embodiment. For example, the high frequency components can be obtained by subtracting the low frequency components Glpf[n] obtained from the low pass filter from the value obtained from the acceleration sensor 4.

In other words, the high frequency components are given by the following formula.

$$Ghpf[n]=|G[n]-Glpf[n]|$$

Alternatively, the high frequency components may be given by the following formula.

$$Ghpf[n]=|(1-\beta)(G[n]-G[n-1]-Ghpf[n-1])|$$

where $\beta$ is a parameter used to change the characteristics of the high pass filter. The characteristics of the high pass filter can be changed to the characteristics of the low pass filter with value of $\beta$.

The shock/vibration determination engine 11 performs this calculation for the X axis, Y axis, and Z axis and holds the obtained values Ghpf[n].

Filter Function by Hardware

Besides the filter function by software, it is preferred that a low pass filter of hardware be disposed between the EC 5 and the acceleration sensor 4 to cut high frequency components exceeding a predetermined frequency (100 Hz). This filter may be accomplished for example by a filer IC and a combination of parts of capacitors, resistors, and so forth. However, the method for accomplishing this filter is not limited in this embodiment. It is thought that in the normal use of a device, it hardly vibrates at a high frequency exceeding 100 Hz. Thus, it is sufficient to designate the cut frequency of the low pass filter as around 100 Hz. In addition, to remove noise, it is preferred to use the low pass filter.

Moreover, due to the limitation of the processing capacity, the EC 5 (shock/vibration determination engine 11) may not detect high frequency components. If software is designed to poll values of the axes every 5 msec, sampling frequency will become 200 Hz. Thus, since the EC 5 may not detect a frequency higher than 200 Hz, it is necessary for hardware to filter high frequency components.

[Determination of Shock/Vibration]

When the value of Ghpf[n] obtained from the foregoing calculation exceeds a predetermined value, the shock/vibration determination engine 11 determines that strong shock have been applied and sends a "request for issuing the head retraction command to the HDD 3" to the utility software 13.

Determination with Respect to Variation of Gravitational Components—No. 1 (Detection of Zero-Gravity)

When a device is dropped in free fall state without shock or vibration, the device finally collides with the floor or the like. As a result, the possibility of which shock is applied to the device is high. Thus, when zero-gravity is detected, it is necessary to retract the magnetic head of the HDD 3 to the data-free landing zone. When the shock/vibration determination engine 11 has determined that zero-gravity state occurs, the shock/vibration determination engine 11 sends the "request for issuing the head retraction command to the HDD 3" to the utility software 13.

The shock/vibration determination engine 11 determines that zero-gravity state has occurred when the following two conditions are satisfied.

1. When the values that have been processed by the high pass filter for the X axis, Y axis, and Z axis are denoted by Gx_hpf[n], Gy_hpf[n], and Gz_hpf[n], respectively, the condition of $(Gx\_hpf[n])^2+(Gy\_hyp[n])^2+(Gz\_hpf[n])^2 \leq (0.6\ G)^2$ is satisfied. Since the value on the right side (0.6 G) is a parameter that varies depending on the characteristics of the acceleration sensor and the device, the value may be changed.

2. When the values that have been processed by the low pass filter for the X axis, Y axis, and z axis are denoted by Gx_lpf[n], Gy_lpf[n], and Gz_lpf[n], respectively, the condition of Gx-lpf[n]≦10, Gy_lpf[n]≦10, Gz_lpf[n]≦10 is satisfied.

Since the value on the right side (10) varies depending on the characteristics of the acceleration sensor and the device, the value may be changed.

Determination with Respect to Variation of Gravitational Components—No. 2 (Detection of Carrying State)

At the moment the note-type PC is just carried by hand, acceleration may largely vary in the low frequency region. In contrast, when the note-type PC is suddenly lifted, the risk of which it is dropped or hit to something becomes high. Thus, when acceleration in the low frequency region exceeds a predetermined threshold value, the shock/vibration determination engine 11 determines that a carrying state occur and sends a "request for issuing the head retraction command to the HDD 3" to the utility software 13.

The shock/vibration determination engine 11 determines that the carrying state occur when the following condition is satisfied.

1. When the values that have been processed by the low pass filter for the x axis, Y axis, and Z axis are denoted by Gx_lpf[n], Gy_lpf[n], and Gz_lpf[n], respectively, the condition of $(Gx\_lpf[n])^2+(Gy\_lpf[n])^2+(Gz\_lpf[n])^2 \geq (1.8\ G)^2$ is satisfied.

Since the value on the right side (1.8 G) varies depending on the characteristics of the acceleration sensor and the device, the value may be changed.

[Vibration Mode Function]

If vibration in a predetermined level, not hard vibration, is constantly applied, namely in the case that a note-type PC is used in a vehicle such as a train, when it is determined whether or not shock/vibration is applied corresponding to the following method, the operability for the user is not deteriorated.

It is preferred that this function be optionally implemented and when necessary this function be enabled or disabled.

The vibration mode may be determined in the following manner. If a value that has been processed by the high pass filter exceeds a predetermined shock/vibration threshold value in a predetermined period (A msec) a predetermined number of times (B times), it is determined that the "vibration model" occur. In contrast, if a value that has been processed by the high pass filter does not exceed the predetermined shock/vibration threshold value in the predetermined period the predetermined number of times in the "vibration mode", it is determined that the "normal" mode occur. Since A and B are parameters, their values are not designated in this example.

In the vibration mode, the shock/vibration determination is roughly performed. For example, the shock/vibration threshold value is increased so that the magnetic head retraction event does not easily occur. Instead, only when the value obtained by $(Gx\_hpf[n])^2+(Gy\_hpf[n])^2+(Gz\_hpf[n])^2$ becomes a very large value, the magnetic head retraction request may be issued.

[Changing Sensitivity when Key of Keyboard is Pressed]

Depending on the position of the acceleration sensor 4 disposed in the note type PC 100, the output of the acceleration sensor 4 may largely vary with shock that occurs when a key of the keyboard 9 is pressed. According to this embodiment, since the EC 5 that controls the keyboard 9 has the shock/vibration determination engine 11, the state of the keyboard 9 can be easily detected. Thus, when a key of the keyboard 9 is pressed, the threshold value can be changed so that the operability for the user is not deteriorated.

Instead of the EC 5, the main CPU of the PC may be provided with a function of changing the sensitivity in the state that a key of the keyboard 9 is pressed. In other words, application software that operates on the OS performs this function. As the most common method of which the OS or application software that operates on the OS detects the state that a key of the keyboard 9 is pressed, key numbers called scan codes are transmitted. However, if the target device (note-type PC) has a plurality of keyboards, for example the PC is provided with a built-in keyboard and an external keyboard, it is difficult for the OS or the application software that operates thereon to determine whether or not scan codes are received from the built-in keyboard or the external keyboard. Since a possibility of which shock or vibration that occurs when a key of the external keyboard is pressed affects the built-in HDD 3 of the note-type PC 100 is relatively small, it is not preferred that the sensitivity be changed corresponding to the shock or vibration that occurs when a key of the external keyboard is pressed.

From the foregoing point of view, when the EC 5 is provided with the function of changing the sensitivity in the state that a key of the keyboard 9 is pressed, the sensitivity can be changed in the state that a key of the built-in keyboard 9 is pressed.

In the method of determining whether or not a key is pressed with a scan code, when it is received, a key of the keyboard 9 may not be pressed. In other words, after the keyboard 9 side has detected the state that a key of the keyboard 9 is pressed (a physical signal varies) and issued a scan code until the OS or the application software that operates thereon receives the scan code, there is a time lag at least for the communication time. For a function whose result largely depends on response time, for example protection of the HDD 3, it is important to determine whether or not there is a necessary to retract the head as quick as possible. From these points of view, the EC 5 that can detect the state that a key is pressed with a physical signal is advantageous. In other words, when the EC 5 is provided with the function of changing the sensitivity in the state that a key of the keyboard 9 is pressed, the EC 5 can have an advantage in timing. When it is necessary to change the sensitivity in the state that a key of the keyboard 9 is pressed regardless of whether or not the keyboard 9 is a built-in keyboard or an external keyboard, if the PC does not have a device that connects an external keyboard, the main CPU, namely the OS or application software that operates thereon may be provided with the function instead of the EC 5.

[Changing Sensitivity in the State that Lid is Closed or Closing Operation is Performed]

When the note-type PC is used, after the lid is closed, it may be carried by hand. When the state that the lid is closed is detected, by changing the threshold value for high sensitivity, a risk of which the head of the HDD 3 contacts its disk surface due to shock or vibration can be reduced. As a result, a chance of which the note-type PC 100 breaks down can be reduced. In this case, if the state that the lid is opened is detected, the threshold value is restored to the normal value. At the moment the lid (door) is closed, if the threshold value is decreased and the sensitivity is lowered, the head can be prevented from being unnecessarily retracted to the data-free landing zone. As a result, the operability for the user can be prevented from being deteriorated. In this case, the threshold value may be decreased for a period (several seconds) until the lid is closed. Thereafter, the threshold value is restored to the normal value. Instead, the threshold value may be increased and the sensitivity may be raised.

Like the foregoing "function of changing sensitivity in the state that a key of keyboard is pressed", when the lid is closed or its closing operation is performed, the sensitivity change process can be performed by application software that operates on the OS. However, after the lid is closed (a physical signal varies) until the OS detects it, there is a time lag (the EC 5 interrupts the OS so as to inform it that the lid is closed). For a function whose result largely depends on response time, for example protection of the HDD 3, it is important to determine whether or not there is a necessary to retract the head as quick as possible. When the EC 5 that can detect the state that the lid is closed with a physical signal determines this state, the EC 5 can have an advantage in timing.

[Setting up Sensitivity by User]

A portable device such as a note-type PC can be used in various environments. It can be considered that the portable device is used in various environments, for example in the house, the user uses the device on the user's desk or the like. When the user rides on a train or a car, the user uses the device on the user's lap. Levels of vibration and shock largely vary depending on environments in which the user uses the device.

As previously described, safety of the HDD 3 is assured if the magnetic head is retracted while the magnetic head of the HDD 3 is accessing its magnetic disk. However, user-friendliness will decrease since accessing to the HDD 3 is temporarily denied. Thus, in this embodiment, the user is permitted to select safety or performance for the HDD 3 by setting up the sensitivity of shock and vibration.

The sensitivity of shock and vibration can be changed by changing the threshold value of the foregoing "determination of shock/vibration". This function can be accomplished only by software without necessity to convert and/or process electric signals that are output from the acceleration sensor 4.

Next, an operation of the note-type PC 100 having the foregoing functions will be described.

[Overall Operation]

Figure 5:
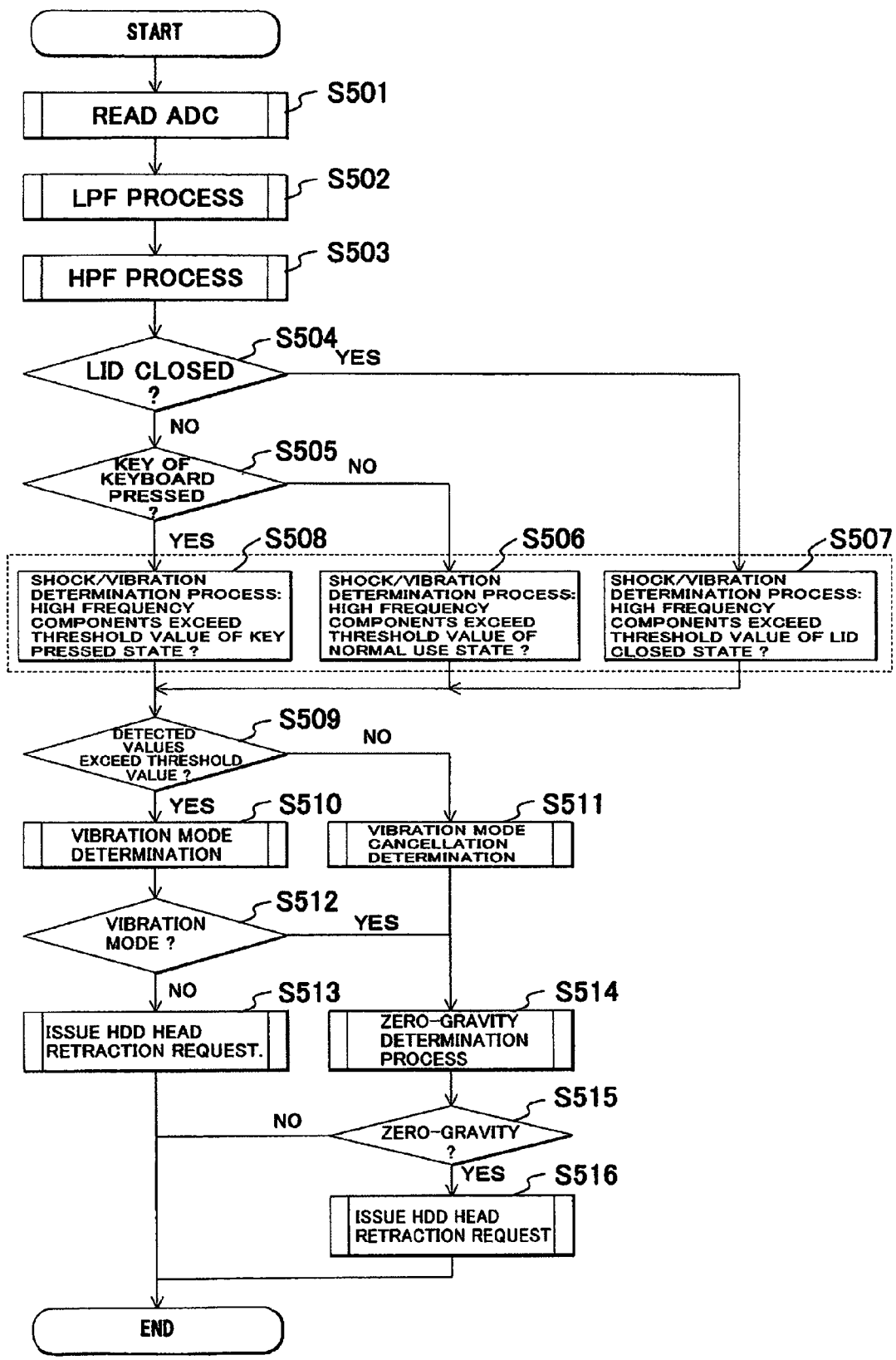
FIG. 5 is a flow chart showing an overall operation of a shock/vibration determination engine of the EC.

FIG. 5 is a flow chart showing an overall operation of the built-in shock/vibration determination engine 11 of the EC 5.

The EC 5 reads acceleration information (analog outputs) for the X axis, Y axis, and Z axis. The ADC (A/D converter) 12 converts the acceleration information as analog signals into digital signals (at step S501). The EC 5 obtains low frequency components from the low pass filter for the acceleration information for the X axis, Y axis, and Z axis (at step S502). The EC 5 subtracts the low frequency components that are output from the low pass filter from the acceleration information for the X axis, Y axis, and Z axis and obtains high frequency components (at step S503).

The EC 5 determines whether or not the lid is closed corresponding to an output of the lid open/close detection section 10 (at step S504). When the determined result indicates that the lid is not closed (No at step S504), the EC 5 determines whether or not a key of the keyboard 9 is pressed (at step S505). When the determined result indicates that a key of the keyboard 9 is not pressed (NO at step S505), the EC 5 performs a shock/vibration determination process to determine whether or not the acceleration values of the high frequency components exceed a threshold value of the normal use state (at step S506).

When the determined result at step S504 indicates that the lid is closed (YES at step S504), the EC 5 performs the shock/vibration determination process to determine whether or not the acceleration values of the high frequency components exceed a threshold value of the lid closed state (at step S507). When the determined result at step S505 indicates that a key of the keyboard 9 is pressed (YES at step S505), the EC 5 performs the shock/vibration determination process of determining whether or no the acceleration values of the high frequency components exceed a threshold value of the key pressed state (at step S508).

When the determined result in the shock/vibration determination process at step S506, step S507, or step S507 indicates that the acceleration values of the high frequency components exceed the threshold value (YES at step S509), the EC 5 performs a vibration mode determination process (at step S510). When the acceleration values exceed the shock/vibration threshold value in the predetermined period (A msec) more than the predetermined number of times (B times), the EC 5 determines that the "vibration mode" occur. Otherwise, the EC 5 determines that the "normal mode" occur. When the determined result indicates that the "normal mode" occurs (NO at step S512), the EC 5 sends a "request for issuing the head retraction command to the HDD 3" to the utility software 13 (at step S513).

When the determined result in the shock/vibration determination process indicates that the acceleration values of the high frequency components do not exceed the threshold value (No at step S509), the EC 5 performs a vibration mode cancellation determination process (at step S511). In other words, when the determined result in the vibration mode that the acceleration values of the high frequency component do not exceed the threshold value, the EC 5 cancels the "vibration mode" and changes it to the "normal mode". However, in the "normal mode", the EC 5 keeps the "normal mode".

When the acceleration values of the high frequency components do not exceed the threshold value in the shock/vibration determination process (NO at step S509) or the determined result at step S512 indicates that the "vibration mode" occurs (YES at step S512), the EC 5 performs a zero-gravity determination process, namely the determination processes 1 and 2 with respect to variation of gravitational components (detection of zero-gravity state) and (detection of carrying state) (at step S514). When the determined result indicates that the zero-gravity state or carrying state occurs (YES at step S515), the EC 5 sends a "request for issuing the head retraction command to the HDD 3" to the utility software 13 (at step S516)

Instead, a gravitational component variation determination process may be performed with only low frequency components of acceleration information obtained from the low pass filter, not with high frequency components obtained from the high pass filter.

Figure 6:
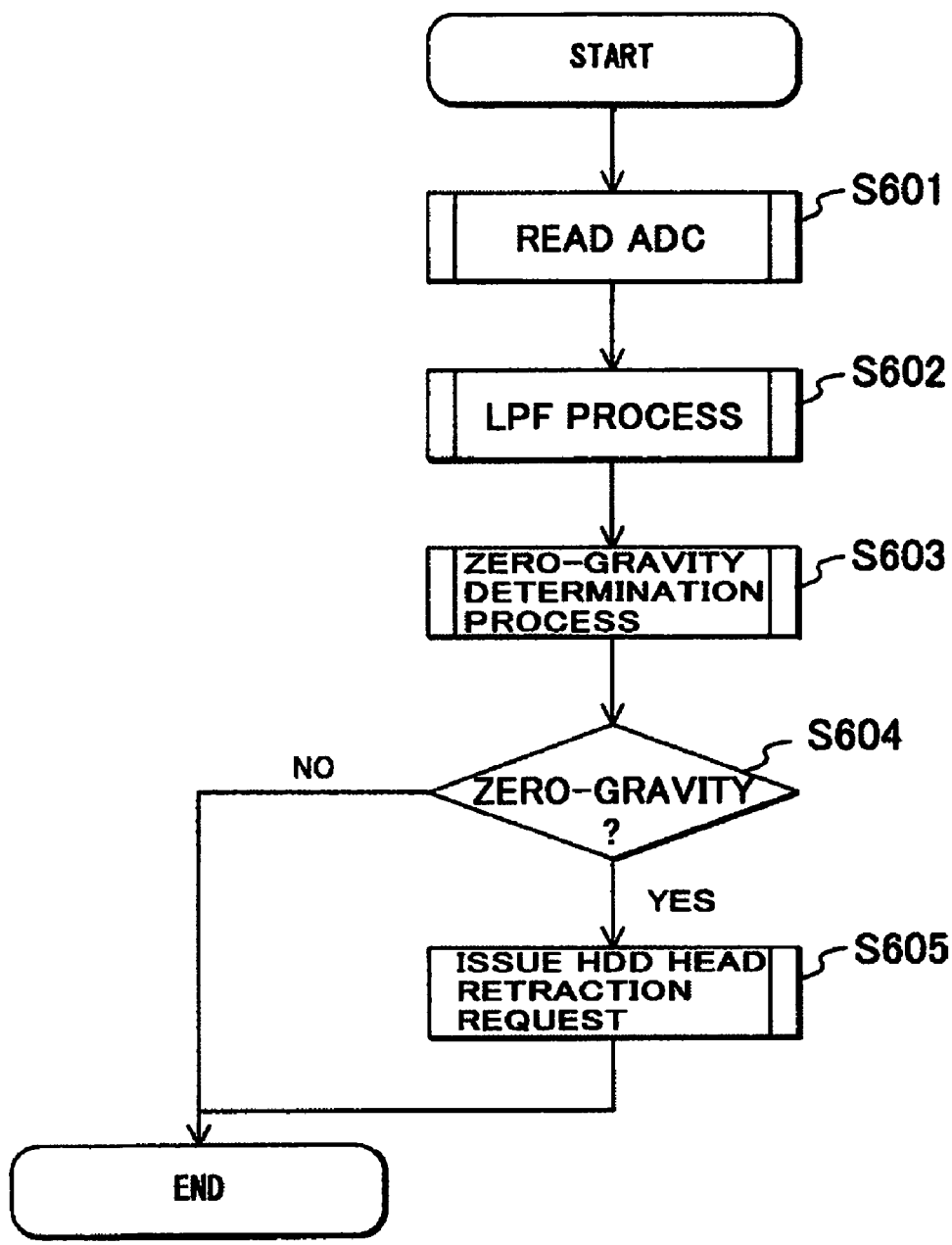
FIG. 6 is a flow chart showing an operation for a shock/vibration determination process corresponding to only low frequency components of acceleration information.

FIG. 6 is a flow chart showing an overall operation of the shock/vibration determination engine 11 of the EC 5.

The EC 5 reads acceleration information (analog outputs) for the X axis, Y axis, and Z axis from the acceleration sensor 4. The ADC 12 converts the analog signals into digital signals (at step S601). The EC 5 obtains low frequency components from the low pass filter for the acceleration information for the X axis, Y axis, and Z axis obtained from the acceleration sensor 4 (at step S602). Thereafter, the EC 5 performs the gravitational component variation determination process for the low frequency components of acceleration information obtained from the low pass filter (at step S603). At this point, the gravitational component variation determination process may be performed by determining that the gravitational state occur when the two conditions of the gravitational component variation determination process No. 1 (detection of zero gravity state) are satisfied. When the determined result indicates that the zero-gravity state occurs (YES at step S604), the EC 5 sends a "request for issuing the head retraction command to the HDD 3"to the utility software 13 (at step S605).

Next, the shock/vibration sensitivity change process will be described in detail.

To increase the response sensitivity, the threshold value against values that have been processed by the high pass filter is decreased. In contrast, to decrease the response sensitivity, the threshold value is increased. In the note-type PC 100 according to this embodiment, a man-machine interface (MMI) that allows the user to change the threshold value is accomplished by the utility software 13.

Figure 7:
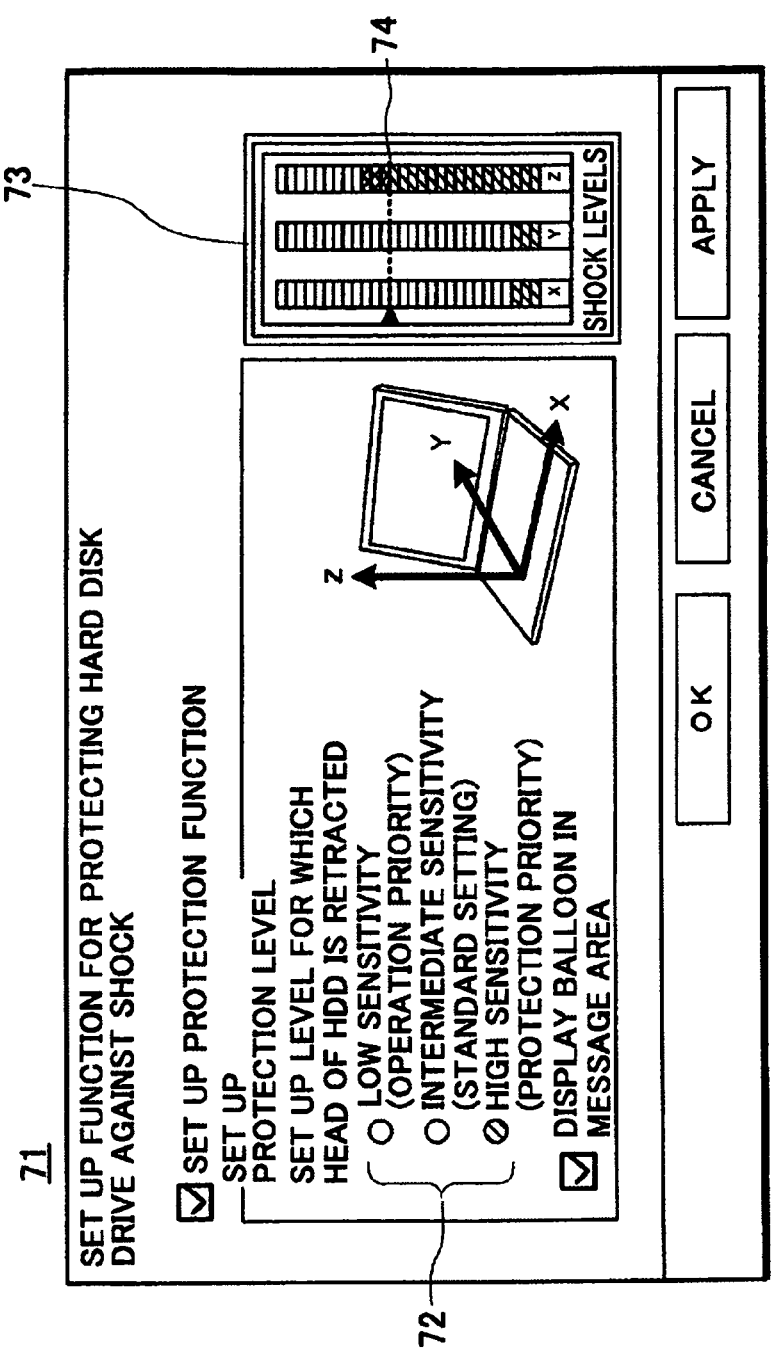
FIG. 7 is a schematic diagram showing an MMI display screen for a sensitivity setup and a shock level display.

FIG. 7 shows an example of a display screen 71 of the MMI. On the display screen 71, the threshold value (sensitivity level) is changed by "setting a protection level". There are three protection levels "low sensitivity (operation priority)", "intermediate sensitivity (standard setting)", and "high sensitivity (protection priority)". A protection level is set up by clicking a radio button 72 corresponding to a desired level with a mouse or the like. The utility software 13 stores information that the user has set up on the MMI display screen 71 in a storage section such as the HDD 3.

The utility software 13 sends a threshold change request to the shock/vibration determination engine 11 corresponding to setup information that has been stored. When the shock/vibration determination engine 11 receives the threshold value change request from the utility software 13, the shock/vibration determination engine 11 changes the threshold value.

The MMI display screen 71 also has a shock level display area 73 that displays shock levels for the three axes with level meters in real time. The shock level display area 73 also displays positions of setup threshold values with lines 74 highlighted with colors so that the user can visually compare the detected shock levels with the setup threshold value. Thus, the user can easily set up optimum sensitivity for example by moving the note-type PC 100.

When the utility software 13 issues the magnetic head retraction command, it is preferred that the utility software 13 display a message like "Head retraction process has been performed." on the display section so as to inform the user that the event has been generated.

Figure 8:
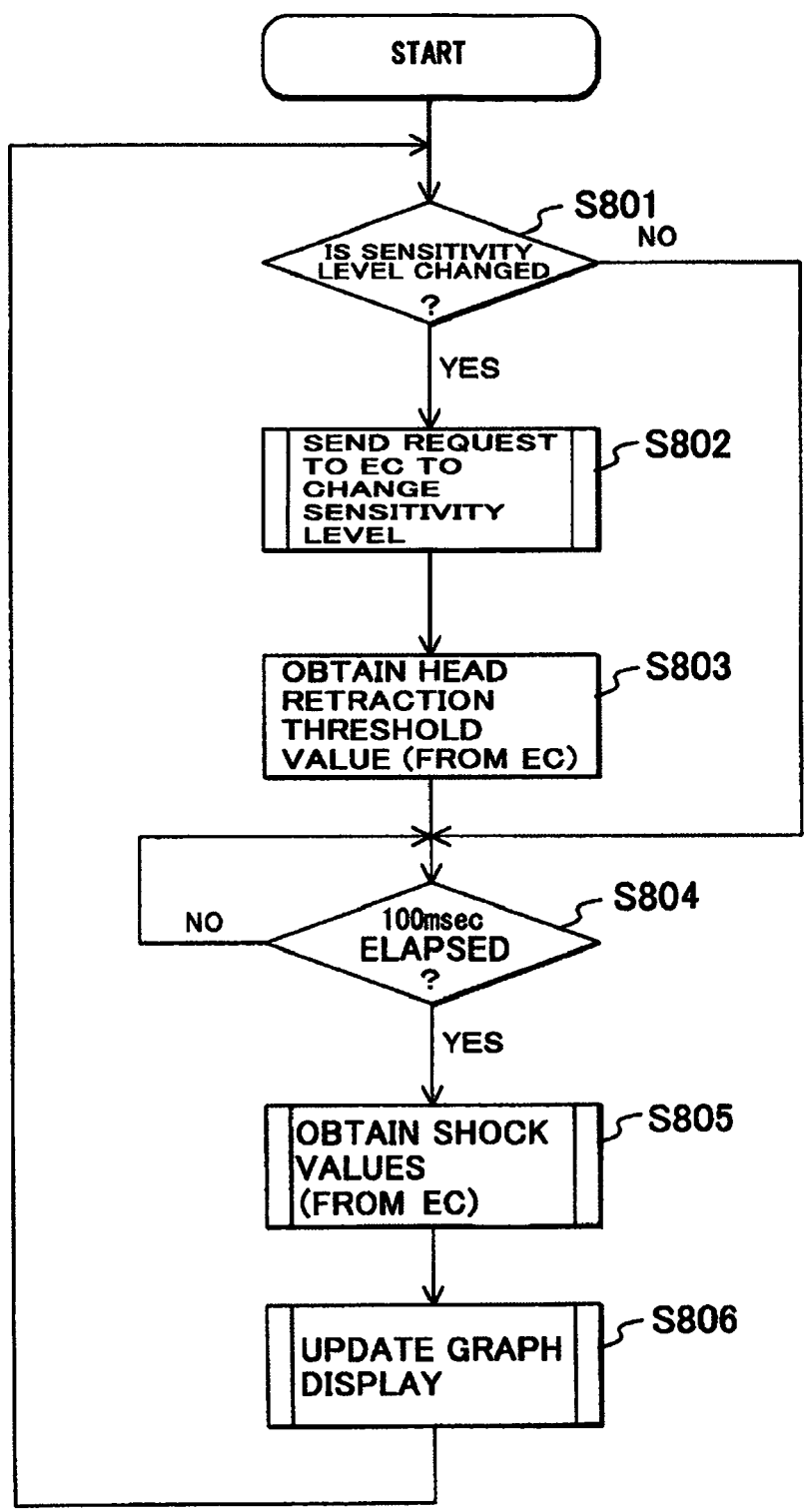
FIG. 8 is a flow chart showing a process for a sensitivity management and a shock level display performed by utility software.

FIG. 8 is a flow chart showing a process with respect to sensitivity management and shock level display by the utility software 13.

Figure 9:
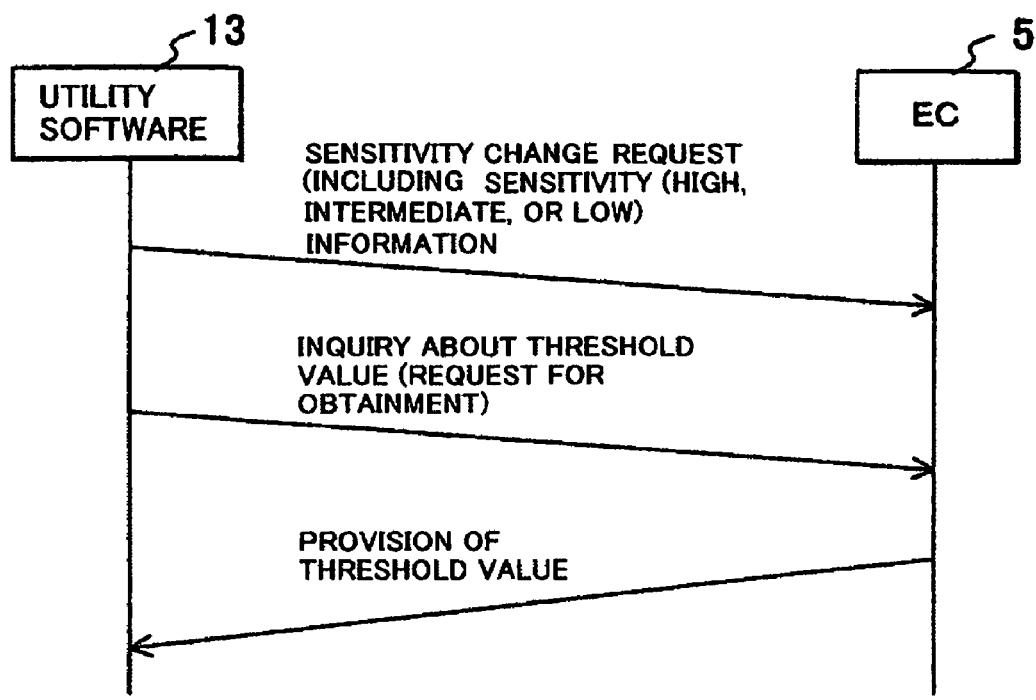
FIG. 9 is a schematic diagram showing a communication sequence between the utility software and the EC.

The utility software 13 checks whether or not a sensitivity level has been changed by a user's operation (at step S801). When a sensitivity level has been changed by a user's operation, the utility software 13 informs the EC 5 of a sensitivity change request including information about new sensitivity level (low sensitivity, intermediate sensitivity, or high sensitivity) (at step S802). Thereafter, the utility software 13 inquires of the EC 5 a threshold value corresponding to the sensitivity level, obtains the threshold value corresponding to the current sensitivity level from the EC 5, and displays their threshold value lines 74 in the shock level display area 73 (at step S803). FIG. 9 shows a communication sequence between the utility software 13 and the EC 5.

Figure 10:
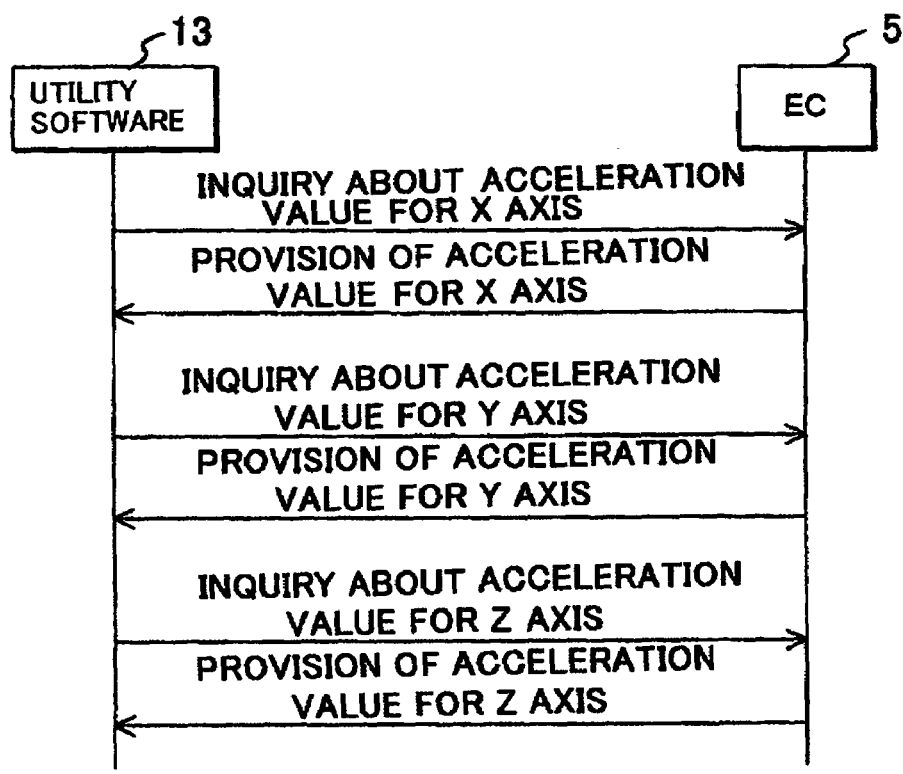
FIG. 10 is a schematic diagram showing another communication sequence between the utility software and the EC.

The utility software 13 obtains data of acceleration values for the X axis, Y axis, and Z axis from the EC 5 for a predetermined period (for example, 100 msec) (at step S804) and updates shock levels in the shock level display area 73 (at step S806). The EC 5 receives an inquiry about acceleration values for the X axis, Y axis, and Z axis at predetermined intervals and sends the maximum values of acceleration values for the X axis, Y axis, and Z axis detected in a past predetermined period to the utility software 13. A communication sequence performed between the utility software 13 and the EC 5 is shown in FIG. 10.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus, comprising:
    a hard disk drive which is capable of retracting a head to a data-free landing zone;
    an acceleration sensor which detects acceleration;
    a determination section which obtains high frequency components from acceleration information detected by the acceleration sensor, obtains a vibration level corresponding to the obtained high frequency components, compares the vibration level with a threshold value which is set up, and determines whether or not there is a necessity to retract the head of the hard disk drive to the data-free landing zone;
    a threshold value setup section which allows a user to change the threshold value and set up the changed threshold value; and
    a display section which is capable of displaying information for the user,
    wherein the threshold value setup section obtains information about the set up threshold value that the user has input on a man-machine interface screen on the display section, periodically obtains a vibration level obtained at the determination section, and displays the obtained threshold value and the obtained vibration level simultaneously on the man-machine interface screen such that the user can compare the threshold value with the vibration level.

2. The information processing apparatus as set forth in claim 1,
    wherein the acceleration sensor detects acceleration in directions of three axes,
    wherein the determination section obtains high frequency components from acceleration information of directions of three axes detected by the acceleration sensor, obtains a vibration level corresponding to the obtained high frequency components, compares the vibration level with a threshold value which has been set up, and determines whether or not there is a necessity to retract the head of the hard disk drive to the data-free landing zone.

3. The information processing apparatus as set forth in claim 1,
    wherein the determination section is embedded in an embedded controller (EC).

4. A head retraction processing method for an embedded hard disk drive, comprising the steps of:
    causing an acceleration sensor to detect acceleration;
    obtaining high frequency components from the detected acceleration information, obtaining a vibration level corresponding to the obtained high frequency components, comparing the vibration level with a threshold value which has been set up, and determines whether or not there is a necessity to retract the head of the hard disk drive to the data-free landing zone; and
    allowing a user to change the threshold value and set up the changed threshold value,
    wherein the threshold setup step is performed by obtaining information about the set up threshold value that the user has input on a man-machine interface screen on a display section, periodically obtaining the vibration level, and displaying the obtained threshold value and obtained vibration level simultaneously on the man-machine interface screen such that the user can compare the threshold value with the vibration level.

5. The head retraction processing method as set forth in claim 4,
    wherein the acceleration detecting step is performed by causing the acceleration sensor to detect acceleration of directions of three axes,
    wherein the determination step is performed by obtaining high frequency components from acceleration information of directions of three axes detected by the acceleration sensor, obtaining a vibration level corresponding to the obtained high frequency components, comparing the vibration level with a threshold value which has been set up, and determining whether or not there is a necessity to retract the head of the hard disk drive to the data-free landing zone.

* * * * *